United States Patent [19]
Kosteva et al.

[11] Patent Number: 5,027,300
[45] Date of Patent: Jun. 25, 1991

[54] TWO LEVEL MULTIPLEXER CIRCUIT SHIFTER APPARATUS

[75] Inventors: Glenn P. Kosteva, Nashua, N.H.; Peili Lin, Malden; Michel M. Raquin, Medford, both of Mass.; Raymond C. Robidoux, Derry, N.H.

[73] Assignee: Bull HN Information Systems Inc., Billerica, Mass.

[21] Appl. No.: 453,559

[22] Filed: Dec. 20, 1989

[51] Int. Cl.[5] .................................................. G06F 7/38
[52] U.S. Cl. .................................................. 364/715.08
[58] Field of Search .................................... 364/715.08

[56] References Cited

U.S. PATENT DOCUMENTS

| 3,818,203 | 6/1974 | Perlowski et al. | 235/164 |
| 4,472,788 | 9/1984 | Yamazaki | 364/715.08 |
| 4,583,197 | 4/1986 | Chappell et al. | 364/715.08 |
| 4,853,199 | 4/1986 | Boothroyd et al. | 364/900 |

FOREIGN PATENT DOCUMENTS

| 59-45547 | 3/1984 | Japan | 364/715.08 |
| 2119976 | 11/1983 | United Kingdom | 364/715.08 |

Primary Examiner—Dale M. Shaw
Assistant Examiner—Long T. Nguyen
Attorney, Agent, or Firm—Faith F. Driscoll; John S. Solakian

[57] ABSTRACT

A shifter includes first and second levels or stages of multiplexer circuits. The inputs of the first stage multiplexer circuits are connected to receive in parallel, a plurality of sets of input operand signals which can be shifted in either direction over a wide range of bit positions. The outputs of these multiplexer circuits are selectively connected to the inputs of a smaller number of second stage multiplexer circuits. Different combinations of the plurality of sets of input operand signals are applied to the different inputs of each first stage multiplexer circuit and different combinations of first level multiplexer outputs are applied to the inputs of each second stage multiplexer circuit. Shift control circuits condition the first and second stage multiplexer circuits to select sets of outputs corresponding to different operand shifts, whose logical sum produces an operand shifted by the specified amount.

23 Claims, 7 Drawing Sheets

| A | B | C | Z |
|---|---|---|---|
| 0 | 0 | 0 | D0 |
| 1 | 0 | 0 | D1 |
| 0 | 1 | 0 | D2 |
| 1 | 1 | 0 | D3 |
| 0 | 0 | 1 | D4 |
| 1 | 0 | 1 | D5 |
| 0 | 1 | 1 | D6 |
| 1 | 1 | 1 | D7 |

LOGIC SYMBOL

Fig. 2d.

LEVEL 1 MULTIPLEXERS

| | | |
|---|---|---|
| I(43+J) | 0 | L22 |
| I(39+J) | 1 | L18 |
| I(35+J) | 2 | L14 |
| I(31+J) | 3 | L10 |
| I(12+J) | 4 | R9 |
| I(8+J) | 5 | R13 |
| I(4+J) | 6 | R17 |
| I(0+J) | 7 | R21 |

M1(J)

J=0-52

LEVEL 2 MULTIPLEXERS

| | | |
|---|---|---|
| M1(0+K) | 0 | R10 |
| M1(1+K) | 1 | R9 |
| M1(2+K) | 2 | R8 |
| M1(3+K) | 3 | R7 |
| M1(16+K) | 4 | L6 |
| M1(17+K) | 5 | L7 |
| M1(18+K) | 6 | L8 |
| M1(19+K) | 7 | L9 |

M2(K)

K=0-33
K=0=CARRY LEFT
K=1-32=OPERAND
K=33=CARRY RIGHT

TWO LEVEL MULTIPLEXER CIRCUIT SHIFTER APPARATUS

BACKGROUND OF THE INVENTION

1. Field of Use

The present invention relates to apparatus for shifting information and more particularly to shifting apparatus which can be efficiently implemented in gate array form.

2. Prior Art

To satisfy the demand for large scale digital integrated circuits, the semiconductor industry has developed three basic approaches. These include standard off-the-shelf circuits, custom circuits and gate arrays. The gate array involves the use of a standard array of a large number of gate circuits diffused into a chip. The metalization pattern converting these gate circuits into functional custom circuits is processed according to the customer's requirements.

A macrocell array is an extension of the gate array concept. A macrocell is an array subsection performing a higher level logic function than a basic gate. A macrocell array is an array circuit in which macro functions used to define logic simulations are directly implemented within the basic cell structure rather than formed by interconnecting gates. Each cell in a macrocell array contains a number of unconnected transistors and resistors. A metalization process transforms the interconnected transistors and resistors within each cell into Small Scale Integrated (SSI) logic functions called macros. The macros take the form of standard logic elements such as dual type "D" flip-flops, multiplexers and many other functions.

The high density packing of a macrocell array chip offers substantial reductions in system component count and power dissipation. Thus, it becomes desirable to utilize such chips in computer designs.

With recent advances, it is possible for a processor to execute millions of instructions per second (MIPS). Many different types of such instructions simply involve the transfer or manipulation of operands through high speed adder circuits.

This can be easily accomplished within a system or machine cycle of operation. However, it is much more difficult and time-consuming to perform shifting types of operations within the same time period particularly where large operands are involved. This has been found to be particularly true where shifting networks have utilized shift registers and multiplexers. In shift register implementations, the time required to execute a multibit shift is normally dependent upon the number of shifts required. Multiplexer implementations using single bit or several bits at a time shifts require several passes or cycles in order to provide larger operand shifts, in addition to requiring a considerable number of interconnections.

The interconnection problem is compounded when a large number of bits are required to be shifted at a time. For example, it was found that when it was attempted to simply expand a prior art multiplexer arrangement capable of shifting right or left by eight bits for a total shift of 16 to accommodate a larger number of shifts, it was found to be too slow and require a considerable amount of chip area when implemented in macrocell array form.

Accordingly, it is a primary object of the present invention to provide a shifter in which multibit shifts can be achieved within a single cycle of operation.

It is a further object of the present invention to provide a shifter which has a minimum number of interconnections and multiplexer circuits so as to be readily implementable in macrocell array form.

SUMMARY OF THE INVENTION

The above and other objects are achieved in a preferred embodiment of the shifter apparatus of the present invention. The apparatus receives from a plurality of input switching circuits the input operand signals to be shifted. These signals are selectively applied to the inputs of the multiplexer circuits of a first level or stage. The outputs are applied to a smaller number of multiplexer circuits of a second level or stage.

Additionally, the input switching circuits apply to the shift control circuits of the shifter apparatus, a set of shift control signals coded to specify the direction and amount of shifts to be applied to said input operand signals. The shift control circuits generate first and second sets of signals which are separately applied to the first and second levels of multiplexer circuits. These sets of control signals are coded to condition the first and second stage multiplexer circuits to select as outputs, the appropriate sets of input operand signals and shifted operand input signals required to provide as outputs of the second stage multiplexer circuits, operand signals shifted by the specified number of bit positions.

In more particular terms, the first and second stages of multiplexer circuits, each include means for shifting signals applied as inputs by a selectable number of different shifts in selected directions. For example, in the preferred embodiment, an operation specifying a left shift of 20 bit positions produces within the first and second stages left shifts of 14 bit positions and 6 bit positions, respectively. By contrast, an operation specifying a right shift of 20 bit positions produces within the first and second stages right shifts of 13 and 7 bit positions, respectively. However, operations specifying left and right shifts of 10 bit positions produce within the first and second stages left and right shifts of 18 and 8 bit positions and right and left shifts of 17 and 7 bit positions.

It is seen that the result is that the resulting algebraic addition of sum of the shifts by both stages provides as an output, the input operand shifted by the specified number of positions within a minimum of time. The arrangement of the present invention requires only a small number of selectable shifts to be provided within each stage which minimizes the number of interconnections between stages.

The above arrangement has the advantage of minimizing the number of interconnections and multiplexer circuits. This enables the arrangement to be implemented in macrocell array form within a small area using standard macrocells.

The above and other objects and advantages of the present invention will be better understood from the following detailed description taken in conjunction with the accompanying drawings.

DETAILED DESCRIPTION OF THE PREFERRED EMBODIMENT

Figure 1:
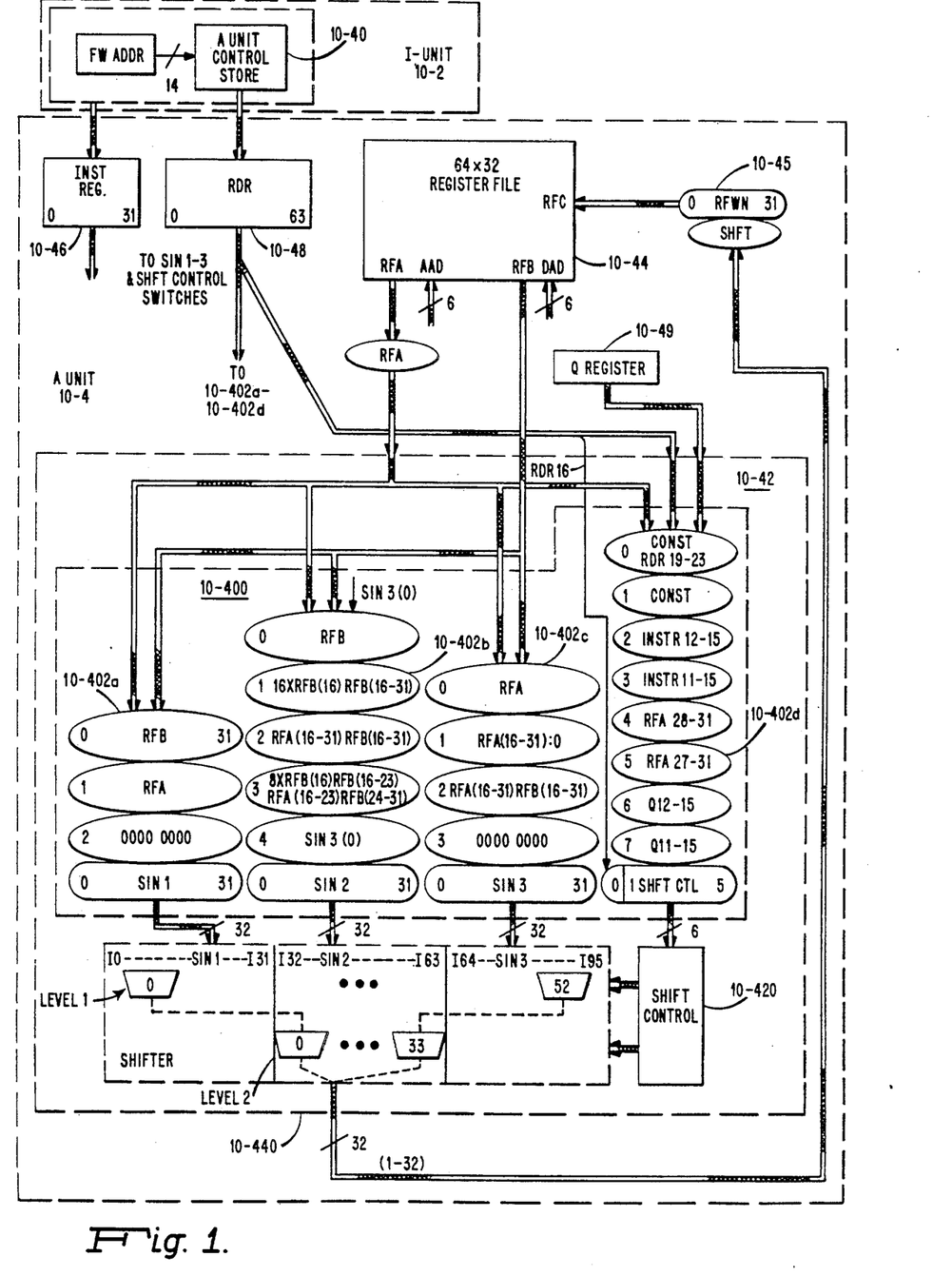
FIG. 1 is a block diagram of a system which includes the shifter apparatus of the present invention.

FIG. 1 shows in block diagram form, a portion of a pipelined processing unit (CPU) 10 which includes the shifter apparatus of the present invention. As shown, the CPU 10 includes the shifter apparatus of the present invention. As shown, the CPU 10 includes an instruction (I) unit 10-2 and an A unit 10-4. The instruction unit 10-2 performs the function of prefetching instructions from an instruction cache unit, not shown, and "cracking" each instruction fetched to determine how the other units, such as the A unit 10-4, will process that instruction.

The A unit 10-4 generates the addresses from instructions it receives from I unit 10-2 which are loaded into an instruction register 10-46. Additionally, it completes the execution of certain types of instructions (e.g. register to register instructions) thereby removing them from the pipeline in a production line fashion. Accordingly, it is important for the A unit 10-4 to be able to complete instructions as fast as possible in order to maintain a high level of performance.

The A unit 10-4 includes a register file memory 10-44 which contains 64 32-bit register locations used to store the contents of registers which are programmer accessible; that is, so-called software visible registers. Also, register file memory 10-44 also includes a number of private registers which are only accessible by the A unit 10-4.

Register file memory 10-44 has dual port read outputs RFA and RFB through which data signals are transferred to shifter 10-42. The ports are addressed by addresses applied to A and B port address inputs AAD and BAD. Writing or updating the contents of file register locations takes place via a write port RFC through a multiposition selector switch 10-45 which has as an input the output of shifter 10-42.

Additionally, A unit 10-4 includes a microprogrammed control store unit represented by block 10-40. In the preferred embodiment, the unit is located off the A unit chip. Control Store unit 10-40 stores sequences of 64-bit microinstruction words which are read out and loaded into an RDR output register 10-48 for use in executing instructions received from I unit 10-2.

As shown, A unit 10-4 further includes a Q register input source and a shifter represented by block 10-42 for performing a variety of operations in response to instructions received from I unit 10-2. The shifter 10-42, constructed according to the teachings of the present invention, is capable of performing shifting operations within a single CPU or machine cycle of operation. As shown, shifter 10-42 has an input section 10-400, a shifter control circuit 10-420 and a two-level shift network 10-440. Input section 10-400 includes a plurality of operand input multiposition selector switches 10-402a through 10-402c designated as SIN1, SIN2 and SIN3 which connect to ports RFA and RFB of register file memory 10-44, as shown. A further multiposition switch 10-402d, included in input section 10-400, is connected to receive shift control signals from instruction register 10-46, RDR register 10-48, register file memory 10-44 and Q register 10-49, as shown.

Each of the switches 10-402a through 10-402d receive a number of control signals from RDR register 10-48. These signals select which input source is connected to apply signals to the output terminals of switches SIN1, SIN2 and SIN3. The control signals are derived from different control fields included within the microinstruction word stored in RDR register 10-48. The codings of the bits included in each of these fields are shown in detail in FIG. 2a.

The shift control 10-420 receives a 5-bit function code corresponding to signals SHIFT1 through SHIFT5 from any one of the sources which connect to control switch 10-402d. A sixth signal corresponding to signal SHIFT0 is provided by RDR register bit position 16, as shown. Shift control 10-420 includes a number of logic gates which decode the 6-bit code into two sets of signals used to control the operation of the shifter network 10-440. These gates are shown in detail in FIG. 2b.

Figure 2A:
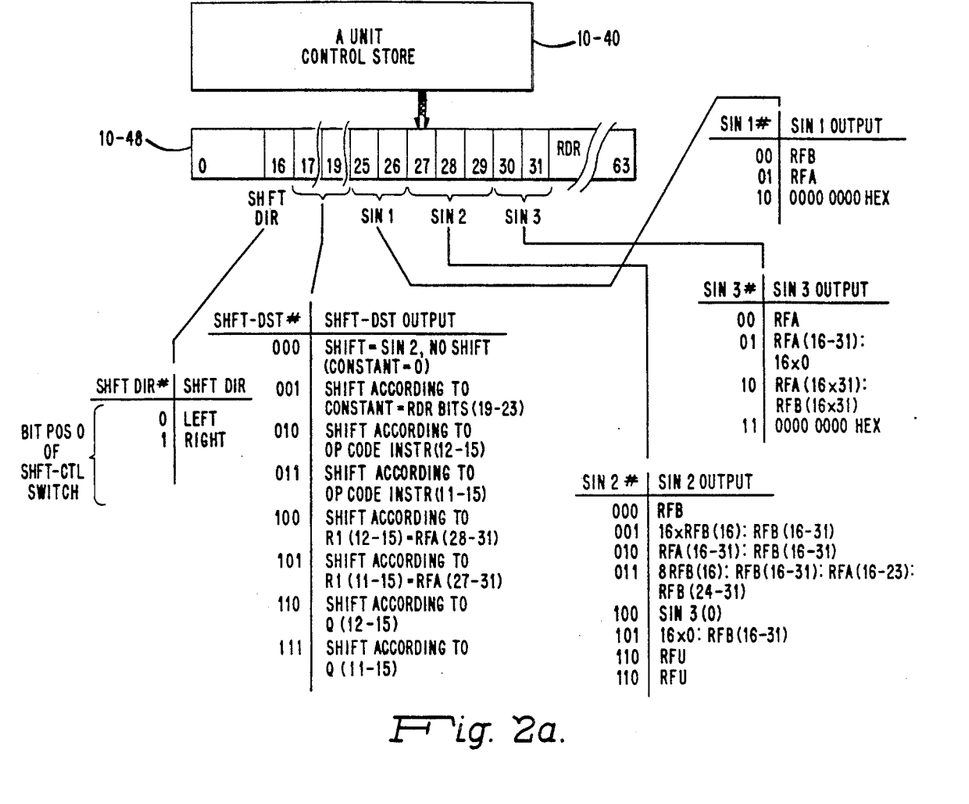
FIGS. 2a through 2e show in greater detail, different portions of the system and shifter of FIG. 1.
Figure 2B:
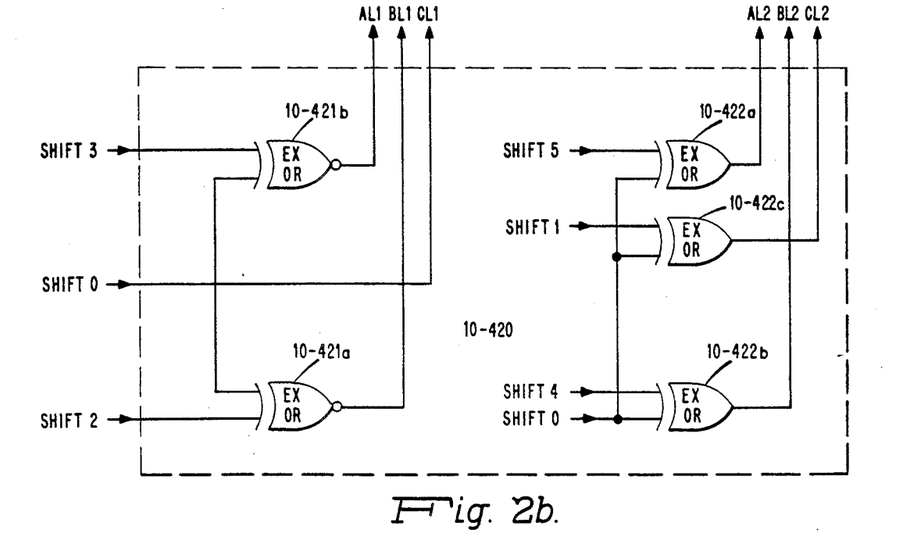

Referring to FIG. 2b, it is seen that shift control 10-420 includes a pair of exclusive NOR gates 10-421a and 10-421b which combine signals SHIFT2 and SHIFT3 to produce output signals AL1 and BL1. These signals, along with signal SHIFT0 relabeled as CL1, are applied to the control input terminals A, B and C of each multiplexer circuit which make up a first stage (level 1) of shifter network 10-440.

A group of exclusive OR gates 10-422a through 10-422c combine signals SHIFT0, SHIFT1, SHIFT4 and SHIFT5 to produce output signals AL2, BL2 and CL2. These signals are applied to the control input terminals A, B and C of each multiplexer circuit which make up a second stage (level 2) of shifter network 10-440.

Figure 2C:
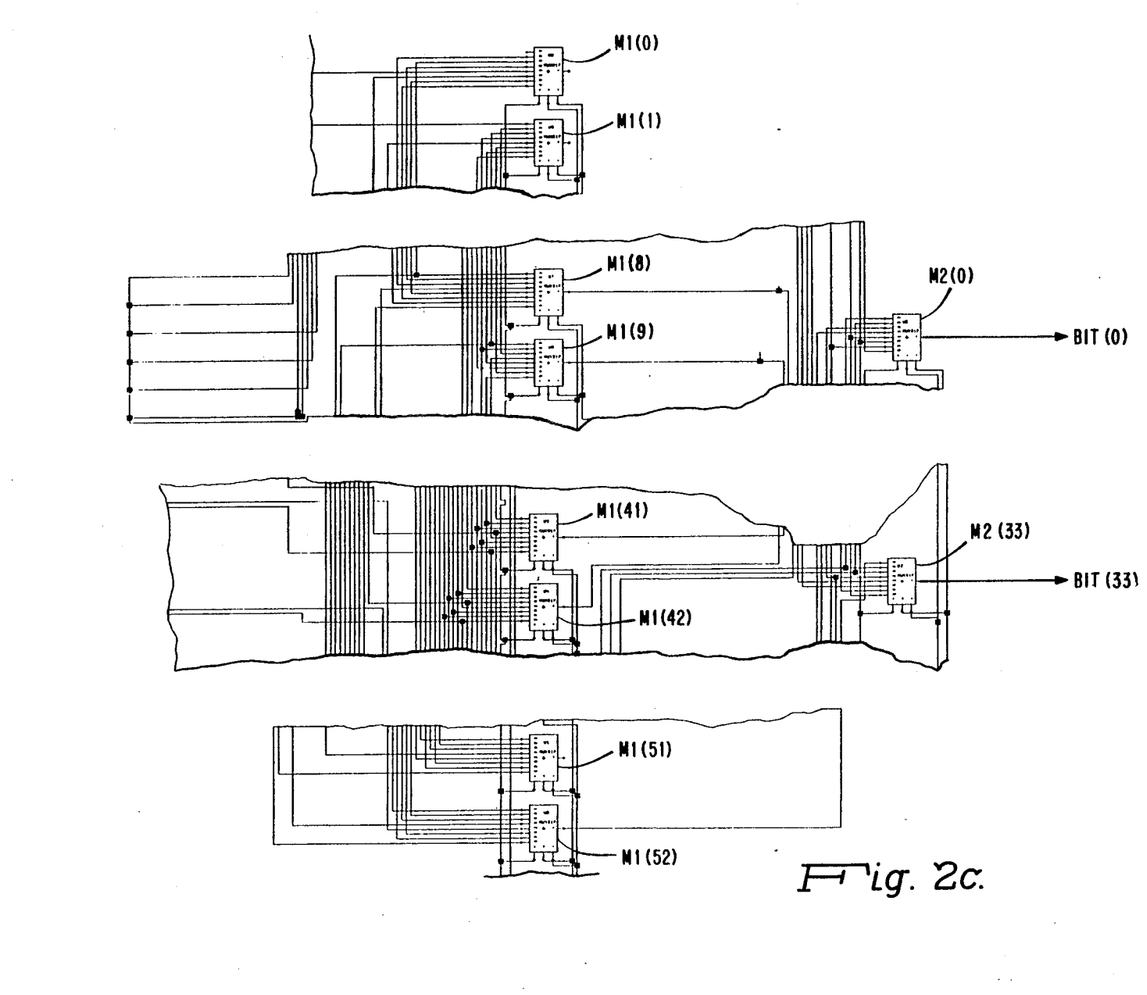
Figure 2D:
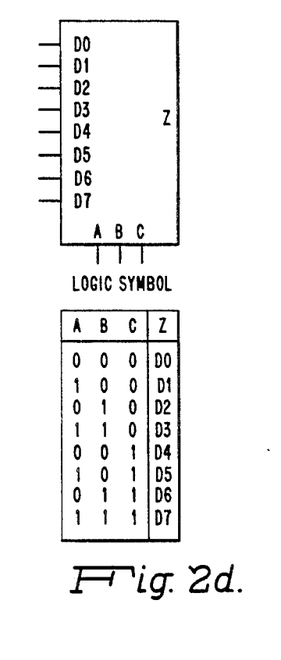
Figure 2E:
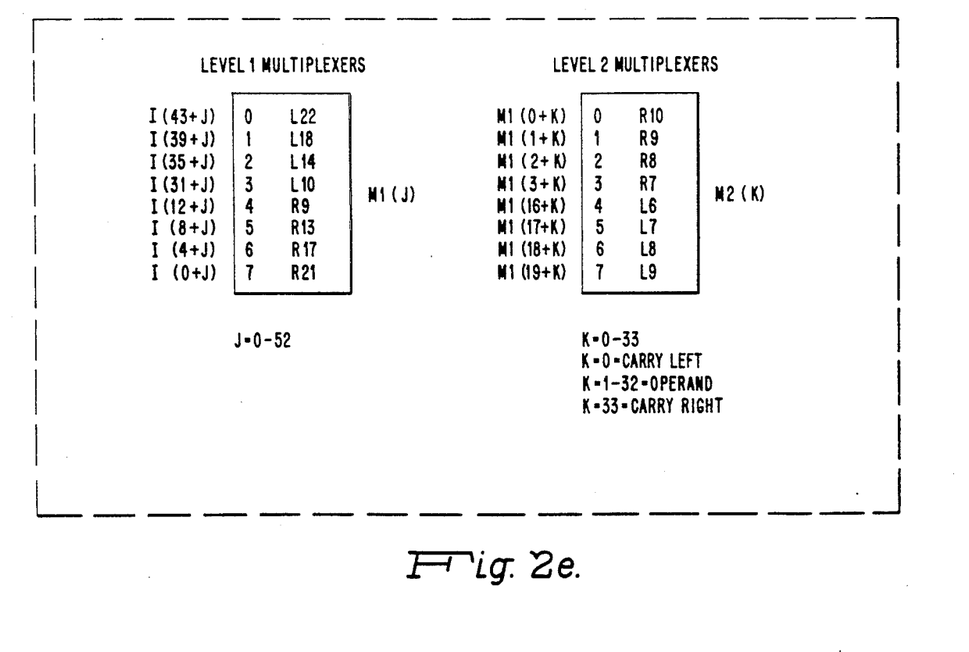

It is seen in FIG. 1 that the level 1 stage includes 53 multiplexer circuits which are connected to receive different combinations of input signals from switches SIN1, SIN2 and SIN3. The outputs of the level 1 multiplexer circuits are applied as inputs to the 34 multiplexer circuits of the level 2 stage. FIG. 2e shows the manner of connecting inputs to the multiplexer circuits of each stage. Referring to the FIGURE, it is seen that the level 1 or first stage multiplexer circuits (M1) have inputs I (43+j) through I (0+j) where j has the values 0 to 52 for each of the eight inputs. The level 2 or second stage multiplexer circuits (M2) receive first stage multiplexer outputs (0+k) through (19+k) where k has the values 0 to 33 for each of the eight inputs. The first multiplexer circuit M2(0) provides the carry left or end around input while the last multiplexer circuit M2 (33) provides the carry right input.

The network shifter stages are so arranged to require a minimum number of interconnections and multiplexer circuits. FIG. 2c diagrammatically illustrates the organization of shifter network 10-440 in greater detail. The FIGURE shows different portions or sections of the design and interconnects. It is seen that layout has been simplified with a small number of interconnects required between the first and second stages.

In the preferred embodiment, a standard CMOS multiplexer macrocell is used to implement shifter network 10-440. A block diagram of this macrocell is shown in FIG. 2d. From FIG. 2d, it is seen that the macrocell is an 8-bit non-inverting multiplexer circuit which has a set of eight data input pins D0 through D7, a set of three control pins A, B and C and an output pin Z. The selection of data inputs is defined by the table in FIG. 2d. The multiplexer circuit takes the form of the macrocell designated as MUX81P, manufactured by LSI Logic Corporation. For further information regarding this part, reference may be made to The HCM05 Compacted Array Products Databook, published by LSI Logic Corporation, Copyright 1987.

The interconnections provide the means of selecting a small number of shifts or shift distances within each stage which collectively provide the desired amount of shift. These shift values are shown by the matrix in an Appendix. Referring to the Appendix, it is seen that for the first stage, each of the selectable right and left shift distances differ by a constant whose value equals 4. Therefore, the four right shift distance values can be expressed as n, n+k, n+2k and n+3k where n=9 and k=4. The left shift distance values are m, m+k, m=2k and m+3k wherein m=n+1 or 10.

In the case of the second stage, the four left and right shift distance values can be similarly expressed. The right shift distance values are n, n+k, n+2k and n+3k where n=7 and k=1. The left shift distance values are m, m+k, m+2k and m+3k wherein m=n−1 or 6. The logical sum of shifts n+m performed by both stages corresponds to the number of shifts specified by the shift instruction. For example, if a 9-bit left shift operation is specified, Appendix A indicates that the shift distance values are left 18 and right 9. The resulting or "logical" sum of these values is the algebraic addition of +18−9=9=L9 wherein L is positive or + and R is negative or −.

DESCRIPTION OF OPERATION

With reference to the diagram of FIG. 4, the operation of shifter 10-42 will now be described. As previously discussed, shifter 10-42 is used to perform operations specified by a number of different program instructions. These include both single and double bit operand instructions such as single or double shift arithmetic left, right closed left or closed right and open left or open right. For each of these instructions, shifter 10-42 performs the shifting of a single operand from 0 up to 31 positions within a time period to enable the instruction to be completed within a single CPU cycle. An additional cycle of time is required only for those double operand instructions designating two register locations to receive the shifted operand result for purposes of program compatibility.

The shifter 10-42 of the present invention performs the shift operations specified by these instructions under the control of the specific fields of microinstruction words shown in FIG. 2a which are read out into RDR register 10-48 during a machine cycle of operation in response to such instructions. Each A unit or machine cycle is 140 nanoseconds. During the first part of each cycle, the contents of an A unit register file memory location are read out. During the remaining part of the cycle, the A unit performs the operation specified by the instruction stored in instruction register 10-46. Near the end of the cycle, the resulting shifted operand produced by shifter 10-42 is applied to register file memory and written into the designated location.

The A register file memory 10-44 locations include seven 16-bit general word operand registers designated as R1 through R7, seven 32-bit address registers designated as B1 through B7 and seven 32-bit double word registers designated as K1 through K7. For further information concerning the organization of register file memory 10-44, reference may be made to the copending patent application of David E. Cushing, Richard P. Kelly, Robert V. Ledoux and Jian-Kuo Shen entitled, "A Mechanism for Automatically Updating Multiple Unit Register File Memories," bearing Ser. No. 07/286,551, filed on Dec. 19, 1988, which is assigned to the same assignee as named herein.

Figure 3:
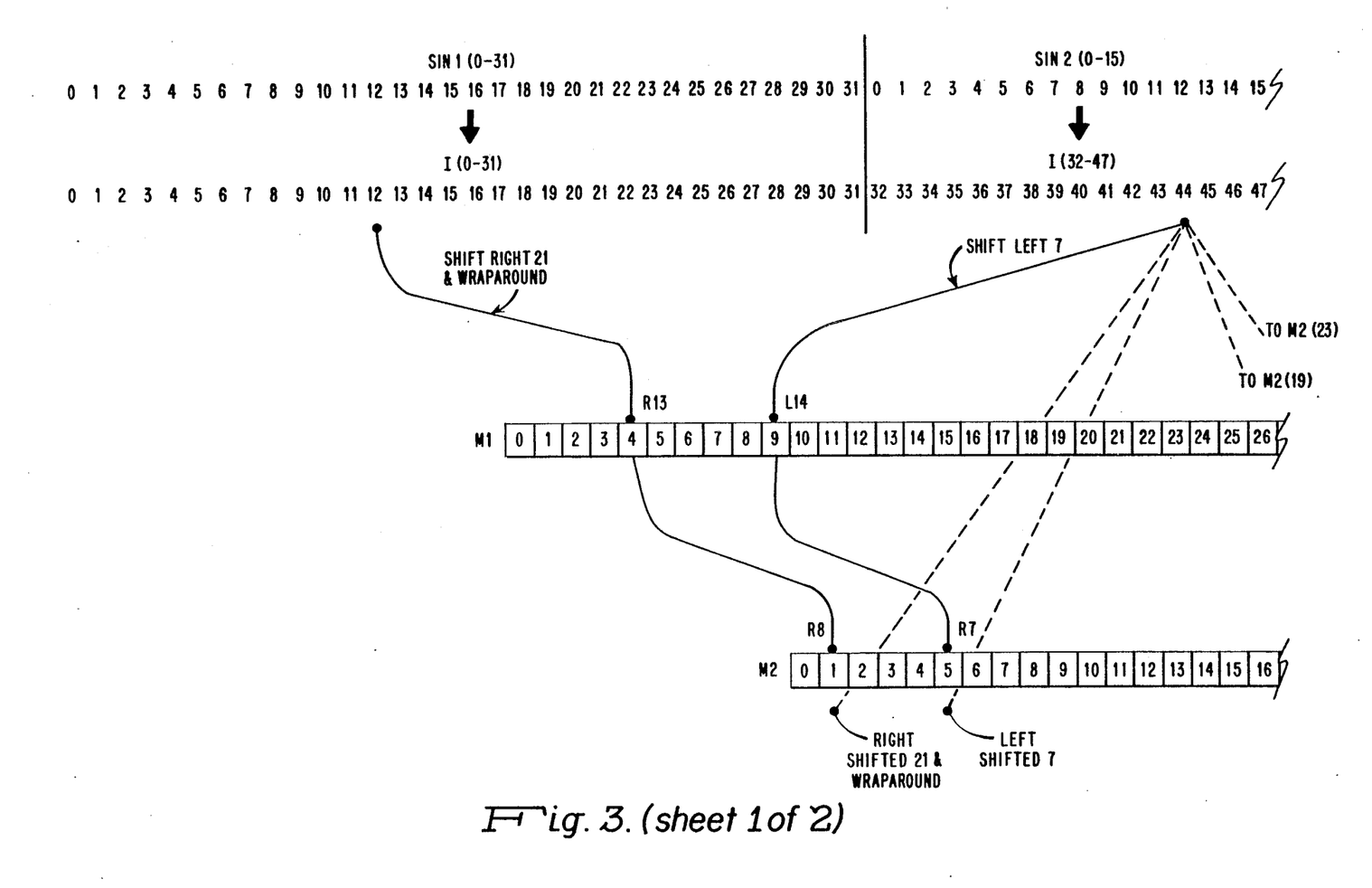
FIG. 3 is a diagram used to explain the operation of the shifter apparatus of the present invention.

FIG. 3 illustrates the manner in which shifter 10-42 executes shifting operations performed on a 32-bit operand received from register file memory 10-44. As shown in FIGS. 4a through 4d, the operand signals applied to the SIN1, SIN2, and SIN3 switches of the input section of shifter 10-42 differ as a function of the type of shift instruction being executed.

Figure 4A:
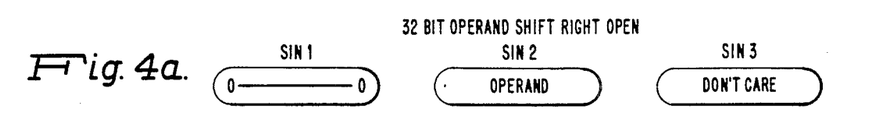
FIGS. 4a through 4d are diagrams which are used to describe how different types of shift operations are performed by the present invention.
Figure 4B:
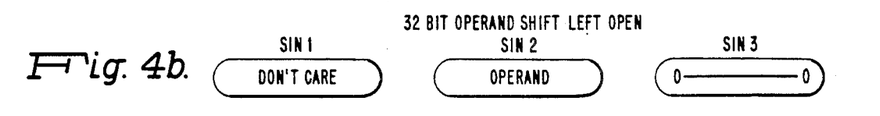

Referring to FIG. 4a, it is seen that for a 32-bit operand shift right open instruction, the 32-bit operand received from the register file memory 10-44 is selected as the output of the SIN2 switch while an ALL ZERO input is selected as the output of the SIN1 switch. In the case of a 32-bit operand shift left open instruction, the outputs from the SIN1 and SIN3 switches are reversed as shown in FIG. 4b.

Figure 4C:
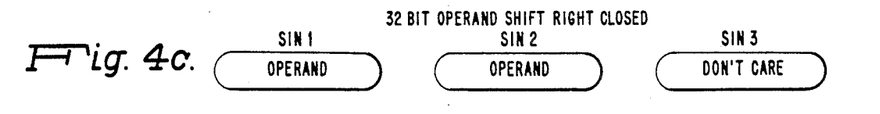
Figure 4D:
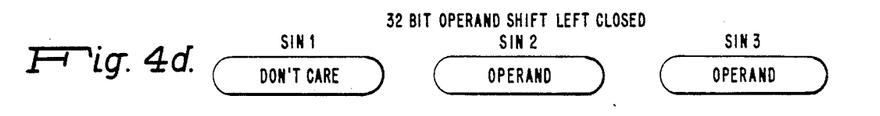

FIGS. 4c and 4d show that two of the switches, SIN1 and SIN2 or SIN2 and SIN3 are used to provide operand outputs for 32-bit operand shift right closed and left closed instructions respectively. Similar combinations of switch outputs are selected for the execution of the other types of shift instructions.

With reference to FIG. 3, it will be assumed by way of example that the A unit 10-4 is required to execute shift instructions which cause shifter 10-42 to perform the different bit shift operations indicated in FIG. 3. In the first example, it is assumed that shifter 10-42 is required to shift an operand left 7 bit positions. This type of operation could result from executing either a shift left open or shift left closed instruction.

In either case, the shift instruction causes a microinstruction word to be read out into RDR register 10-48. Referring to FIGS. 2a, 4a and 4b, it is seen that the bits of positions 25-26, 28-29, and 30-31 of the microinstruction word are so coded to cause the selection of positions 2 and 0 of the SIN1 and SIN2 switches respectively for the shift right open instruction or positions 0 and 3 of the SIN2 and SIN3 switches respectively for a shift left open instruction.

Since the operand bits will overlay the bits to the right in the case of the shift right open instruction, the output from switch SIN3 is represented as "don't care." However, in the case of the shift left open instruction, the output of the SIN3 switch must be all ZEROS since it will form part of the resulting shifted operand. However, the output from switch SIN1 is labeled "don't care" since these bits will be overlaid as in the case of the SIN3 switch output.

As seen in FIG. 2a, the bits of positions 17-19 of the microinstruction word are coded to select the appropriate position of the SHFTCTL switch 10-402d of the shifter input section 10-402. In the case of both of the above instructions, the output of position 3 of the SHFTCTL switch is selected. The bits corresponding to 1-5 are coded to specify up to a 31-bit position shift.

According to the present invention, these bits are interpreted or decoded by the shift control circuits 10-420 of FIG. 2b. As mentioned, the shift control circuits 10-420 generate the two sets of three-bit control codes. A different set is applied to the control inputs of the multiplexer circuits of both stages. The generation of each set of codes is carried out according to the matrix of the Appendix.

More specifically, the most significant bit is coded to indicate the direction of the shift. For first stage operations, a binary "0" significant bit designates a shift left while for second stage operations, it designates a shift right operation. This is due to the reversal of the left and right inputs in the second stage multiplexer circuits to facilitate layout shown in FIG. 2e. The next two bits are coded to specify the number of shifts or shift distance. That is, referring to FIG. 2b, it is seen that signals CL1 and CL2 designating the direction, select the appropriate first or second half multiplexer inputs. The other two signals (AL1, BL1 and AL2, BL2) select one of the former inputs which provides the required number of shifts.

In the first example, in order to effect the shift left 7 operation in FIG. 3, the first stage of multiplexer circuits are conditioned to perform a left shift of 14 bit positions and the second stage of multiplexer circuits are conditioned to perform a right shift of 7 bit positions. As seen in FIG. 2e, input I44 corresponds to input D2. The code applied to the control inputs of the first stage multiplexer circuits causes the selection of the D2 input. That is, the shift control circuits 10-420 apply a code of "010" which is applied to the first stage multiplexer circuits. This causes the D2 input of each circuit of FIG. 2d to be selected as the Z output. The result is that the operand output from the SIN2 switch applied to the first stage is shifted left by 14 bit positions.

The binary "0" in the most significant bit of the "010" code indicates the left shift direction and causes the selection of the first half of the multiplexer inputs of the first stage multiplexer circuits which have been assigned to left shift operations as shown in FIG. 2e. The next two bits "10" select the left fourteen (L14) input D2 of each first stage multiplexer circuit.

The shift left by 7-bit operation is diagrammatically illustrated in FIG. 3 relative to the shifting of bit 12 from switch SIN2. As shown, bit 12 corresponds to input bit 44. The result is that bit 44 which is applied as an input to first stage multiplexer circuit M1 (9) is selected as an output which is to be applied to the second stage.

At the same time, the shift control circuits 10-420 apply a code of "011" to the control inputs of the second stage multiplexer circuits. This causes the D3 input of each circuit of FIG. 2d to be selected as the Z output. This results in the operand outputs applied to the second stage by the first stage being shifted by 7 bit positions. The different bits of the binary code applied to the second stage control inputs function in the same way as described above. That is, the most significant bit is used to select the first half of multiplexer inputs and the remaining bits are used to select the amount of shift or shift distance. However, the binary "0" the most significant bit designates a right shift direction instead of a left shift direction as in the case of the first stage multiplexer circuits.

As shown in FIG. 3, bit 12 corresponding to the output of first stage multiplexer circuit 9 is selected as the output of multiplexer circuit 5 of the second stage in response to code "011." The D3 outputs of the remaining second stage multiplexer circuits are similarly selected. The sum of the shift distances provided by both shifter stages produces left 7 bit shifted operand (i.e., L14+R7).

The shift right 7 operation illustrated in FIG. 3 is carried out in a similar manner. As seen from Appendix A, a shift right of 7 bit positions, requires that the first stage shift the input operand right by 13 bit positions and that the second stage shift left its inputs by 6 bit positions. The shift control circuits 10-420 generate sets of codes (i.e., "110" and "100") which are applied to the control inputs of the first and second multiplexer circuits required to perform the required shifts.

In FIG. 3, the code "101" causes bit 12 of switch SIN2, which corresponds to input R13, to be selected as the output of multiplexer circuit 36. The bits applied to the D5 inputs of the remaining first stage multiplexer circuits as similarly selected. The code "100" causes shifted bit 12 output from multiplexer circuit 36 which corresponds to input L6 to be selected as the output of second stage multiplexer circuit 19. The bits applied to the D4 inputs of the remaining second stage multiplexer circuits are similarly selected. The sum of the shift distances provided by both shifter stages produces the right 7 bit shifted operand.

FIG. 3 further illustrates the flow of bit 12 from switch SIN2 as a result of being shifted left and right by 21 bit positions. These operations would be specified by 32 bit operand shift left and shift right closed instructions. They cause the combinations of SIN1, SIN2 and SIN3 switches to select the outputs shown in FIGS. 4c and 4d. In greater detail, for the shift right closed instruction, bits 27–29 and 30–31 of the microinstruction word are coded to select position 0 of switches SIN2 and switch SIN3 which apply the operand inputs to the first stage multiplexer circuits.

Bit positions 17–19 of the microinstruction are coded to select position 3 of the SHFTCTL switch. The shift control circuits 10-420 generate the appropriate sets of control code signals. The codes for the 21-bit right shift are "101" and "010." As seen from FIG. 3, the code "101" causes bit 12 of switch SIN1 applied as input R13 to be selected as the output of first stage multiplexer circuit 4. The bits applied to the D5 inputs of the remaining first stage multiplexer circuits as similarly selected. The code "010" causes shifted bit 12 output of switch SIN2 corresponding to input R8 to be selected as the output of second stage multiplexer circuit. The bits applied to the D2 inputs of the remaining second stage multiplexer circuits are similarly selected. The sum of the shift distances provided by both shifter stages (i.e., R13+R8) produces the specified 21-bit right shifted operand.

In a similar fashion, the left shift closed instructions causes shifter 10-40 to perform a 21-bit left shift operation. This causes operand inputs to be applied from position 0 of switches SIN2 and SIN3. In this example, the bit 12 output of switch SIN3, corresponding to input 76, is shifted left by 14 bit positions by first stage multiplexer circuit 41 and is then shifted left by 7 bit positions by second stage multiplexer circuit 23 as shown in FIG. 3. The remaining operand bits are similarly shifted. The sum of the shift distances (i.e., L14+L7) produces the specified 21-bit left shifted operand.

Figure 5:
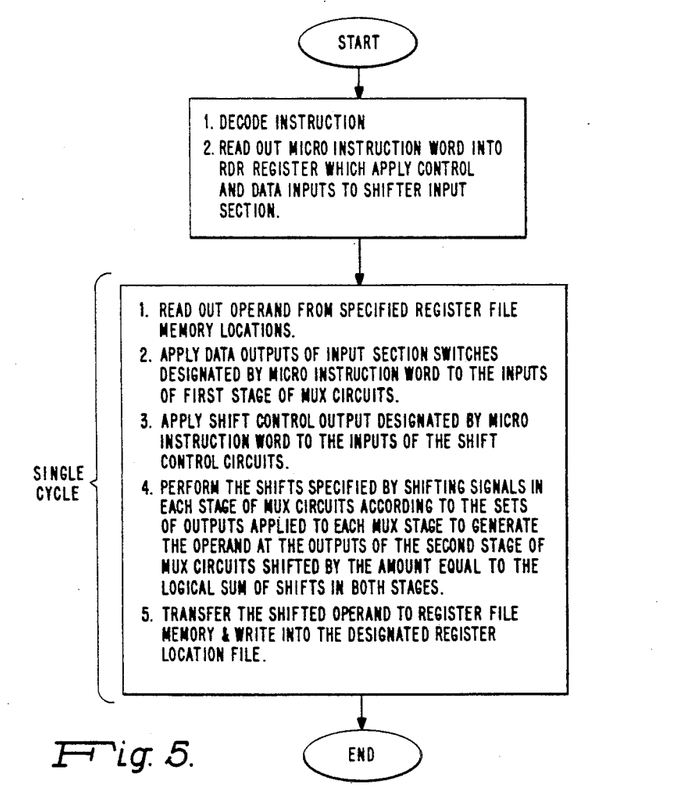
FIG. 5 is a flow diagram illustrating the overall operation of the shifter apparatus of the present invention.

From the above examples, it is seen how the shifter of the present invention is able to execute a variety of shifting operations within one cycle. The overall operation of the shifter is summarized in the flow chart of FIG. 5. It is assumed that the register file memory location into which the shifted operand is being written is assumed to have the same number of bit locations. The shifter of the present invention can also be used with register file memory register locations having half or double the number of bit locations. In such cases, another cycle of operation would be required to complete the operation.

It will be appreciated that many changes may be made to the preferred embodiment of the present invention without departing from its teachings. For example, the invention is not limited to the use of a particular macrocell or technology.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

APPENDIX

| Shift | First stage Right | | | | First stage Left | | | | Second stage Right | | | | Second stage Left | | | |
|---|---|---|---|---|---|---|---|---|---|---|---|---|---|---|---|---|
| | 21 | 17 | 13 | 9 | 22 | 18 | 14 | 10 | 10 | 9 | 8 | 7 | 9 | 8 | 7 | 6 |
| Left 1 | | | | | | | | X | X | | | | | | | |
| Left 2 | | | | | | | | X | | X | | | | | | |
| Left 3 | | | | | | | | X | | | X | | | | | |
| Left 4 | | | | | | | X | | X | | | | | | | |
| Left 5 | | | | | | | X | | | X | | | | | | |
| Left 6 | | | | | | | X | | | | X | | | | | |
| Left 7 | | | | | | | X | | | | | X | | | | |
| Left 8 | | | | | | X | | | X | | | | | | | |
| Left 9 | | | | | | X | | | | X | | | | | | |
| Left 10 | | | | | | X | | | | | X | | | | | |
| Left 11 | | | | | | X | | | | | | X | | | | |
| Left 12 | | | | | X | | | | X | | | | | | | |
| Left 13 | | | | | X | | | | | X | | | | | | |
| Left 14 | | | | | X | | | | | | X | | | | | |
| Left 15 | | | | | X | | | | | | | X | | | | |
| Left 16 | | | | | | | | X | | | | | | | | X |
| Left 17 | | | | | | | | X | | | | | | | X | |
| Left 18 | | | | | | | | X | | | | | | X | | |
| Left 19 | | | | | | | | X | | | | | X | | | |
| Left 20 | | | | | | | X | | | | | | | | | X |
| Left 21 | | | | | | | X | | | | | | | | X | |
| Left 22 | | | | | | | X | | | | | | | X | | |
| Left 23 | | | | | | | X | | | | | | X | | | |
| Left 24 | | | | | | X | | | | | | | | | | X |
| Left 25 | | | | | | X | | | | | | | | | X | |
| Left 26 | | | | | | X | | | | | | | | X | | |
| Left 27 | | | | | | X | | | | | | | X | | | |
| Left 28 | | | | | X | | | | | | | | | | | X |
| Left 29 | | | | | X | | | | | | | | | | X | |
| Left 30 | | | | | X | | | | | | | | | X | | |
| Left 31 | | | | | X | | | | | | | | X | | | |
| By 0 | | | | X | | | | | | | | | X | | | |
| Right 1 | | | | X | | | | | | | | | | X | | |
| Right 2 | | | | X | | | | | | | | | | | X | |
| Right 3 | | | | X | | | | | | | | | | | | X |
| Right 4 | | | X | | | | | | | | | | X | | | |
| Right 5 | | | X | | | | | | | | | | | X | | |
| Right 6 | | | X | | | | | | | | | | | | X | |
| Right 7 | | | X | | | | | | | | | | | | | X |
| Right 8 | | X | | | | | | | | | | | X | | | |
| Right 9 | | X | | | | | | | | | | | | X | | |
| Right 10 | | X | | | | | | | | | | | | | X | |
| Right 11 | | X | | | | | | | | | | | | | | X |
| Right 12 | X | | | | | | | | | | | | X | | | |
| Right 13 | X | | | | | | | | | | | | | X | | |
| Right 14 | X | | | | | | | | | | | | | | X | |
| Right 15 | X | | | | | | | | | | | | | | | X |
| Right 16 | | | | | | | X | | | | | X | | | | |
| Right 17 | | | | | | | X | | | | X | | | | | |
| Right 18 | | | | | | | X | | | X | | | | | | |
| Right 19 | | | | | | | X | | X | | | | | | | |
| Right 20 | | | | | | X | | | | | | X | | | | |
| Right 21 | | | | | | X | | | | | X | | | | | |
| Right 22 | | | | | | X | | | | X | | | | | | |
| Right 23 | | | | | | X | | | X | | | | | | | |
| Right 24 | | | | | X | | | | | | | X | | | | |
| Right 25 | | | | | X | | | | | | X | | | | | |
| Right 26 | | | | | X | | | | | X | | | | | | |
| Right 27 | | | | | X | | | | X | | | | | | | |
| Right 28 | X | | | | | | | | | | | X | | | | |
| Right 29 | X | | | | | | | | | | X | | | | | |
| Right 30 | X | | | | | | | | | X | | | | | | |
| Right 31 | X | | | | | | | | X | | | | | | | |

We claim:

1. Shifting apparatus for performing a variety of shifts on an operand comprising:

a first stage of multiplexer circuit means including input means, output means and control means, said input means being connected for receiving a number of sets of operand signals corresponding to said operand to be shifted;

a second stage of multiplexer circuit means including input means, output means and control means, said input means being connected to said output means of said first stage of multiplexer circuit means; and, shift control circuit means having input means and a pair of output means, said input means being connected to receive a set of control signals representative of the number of shifts to be performed, a different one of said pair of output means being connected to said control means of said first and second multiplexer circuit means, said shifting control circuit means in response to said set of control signals generating first and second sets of signals at said pair of output means, each set of signals being coded to specify a shift direction and one of a number of shift positions, said first stage multiplexer circuit means selecting as outputs, input operand signals specified by said first set of coded signals corresponding to said operand shifted by a first number of shift positions in a specified shift direction and said second stage multiplexer circuit means selecting as outputs, said shifted operand outputs from said first stage multiplexer circuit means specified by said second set of coded signals corresponding to said shifted operand shifted by a second number of shift positions in a specified shift direction, a result of algebraically summing said first and second number of shift positions in said specified shift directions providing at said second stage multiplexer output means, said operand shifted by said required number of shifts within a single cycle of operation.

2. The shifting apparatus of claim 1 wherein said apparatus further includes input switch means connected to said first stage of multiplexer circuit means and to said shift control circuit means for applying said plurality of sets of input operand signals and said set of control signals respectively.

3. The shifting apparatus of claim 2 wherein said apparatus further includes first interconnection means for connecting said input switching means to said input means of said first stage multiplexer circuit means in a predetermined manner for applying said plurality of sets of input operand signals.

4. The shifting apparatus of claim 3 wherein said interconnection means consists of a minimum number of conductive wires.

5. The shifting apparatus of claim 2 wherein said first stage has a first number of multiplexer circuits and said second stage has a second number of multiplexer circuits which is less than said first number of multiplexer circuits.

6. The shifting apparatus of claim 5 wherein said predetermined manner is defined according to the following expression:

$D0=I(43+j); D1=I(39+j); D2=I(35+j)$
$D3=I(31+j); D4=I(12+j); D5=I(8+j)$
$D6=I(4+j); D7=I(0+j)$ wherein D0–D7 correspond to pins of each first stage multiplexer circuit numbered M1 (j) wherein j has integer values from 0 to said first number of multiplexer circuits minus 1 which receive different ones of said plurality of sets of input operand signals I.

7. The shifting apparatus of claim 5 wherein said apparatus further includes second interconnection means for interconnecting the inputs of each of the second stage multiplexer circuits to the outputs of the first stage multiplexer circuits in a predetermined manner so as to minimize the number of conductive wires.

8. The shifting apparatus of claim 7 wherein said predetermined manner is defined by connecting each corresponding output M1 of said first stage multiplexer circuit numbered M1(j) to each second stage multiplexer circuit according to the following expression:

$D0=M1(0+k); D1=M1(1+k); D2=M1(2+k)$
$D3=M1(3+k); D4=M1(16+k); D5=M1(17+k)$
$D6=M1(18+k); D7=M1(19+k)$ wherein D0–D7 correspond to pins of each second stage multiplexer circuit numbered M2(k) wherein k has integer values of 0 to said second number of multiplexer circuits minus 1 and j has integer values from 0 to said first number of multiplexer circuits minus 1.

9. The shifting apparatus of claim 7 wherein first and second halves of said number of inputs of each multiplexer circuit of said first and second stages are connected to provide a predetermined number of different shift positions in a predetermined direction which are opposite to each other.

10. The shifting apparatus of claim 9 wherein said first and second halves of inputs of each multiplexer circuit of said first and second stage are allocated according to the following expression:

$D0=+(n+3k); D1=+(n+2k); D2=+(n+k);$
$D3=+(n); D4=-(m); D5=-(m+k);$
$D6=-(m+2k); D7=-(m+3k)$ wherein $m=n-1$; D0–D7 correspond to pins of each multiplexer circuit and wherein $k=4$ and $n=10$ for said first stage multiplexer circuits, $k=1$ and $n=7$ for said second stage multiplexer circuits and wherein + and − signs denote left and right shifts respectively.

11. The shifting apparatus of claim 2 wherein said input switch means includes a plurality of selector circuits, each of a number of said plurality of selector circuits being connected to receive one of said plurality of sets of input operand signals and one of said plurality of selector circuits being connected to receive said set of control signals from a number of input sources and wherein said shifting apparatus further includes input control means connected to said plurality of selector circuits for applying coded signals designating which ones of said number of selector circuits are to apply said input operand signals to said first stage of multiplexer circuit means and which one of said number of sources is to apply said set of control signals.

12. Shifting apparatus for performing a variety of shifts on a large operand comprising:

a plurality of input selection circuits for receiving a plurality of like sets of input operand signals, each set corresponding to said operand to be shifted and a set of control signals representative of the number of shifts to be performed;

a first stage of multi-input multiplexer circuits, each circuit including a number of input pins, an output pin and a number of control pins, said number of input pins being connected to a number of said plurality of input selection circuits for receiving said sets of operand signals;

a second stage of multi-input multiplexer circuits, each circuit including said number of input pins, an output pin and said number of control pins, said number of input pins being connected to different ones of said output pins of said first stage of multiplexer circuits; and, shift control circuit means having a number of inputs and two sets of outputs, said number of inputs being connected to one of said plurality of selection circuits for receiving said set of control signals, a different set of said outputs being connected to said number of control pins of said first and second multiplexer circuits, said shift control circuit means in response to said set of control signals generating first and second sets of signals at said sets of outputs, each set of signals being coded to specify a shift direction and one of a number of shift positions, said first stage multiplexer circuits selecting as outputs to said output pins, input operand signals specified by said first set of coded signals corresponding to said operand shifted by a first number of shift positions in a specified shift direction and said second stage multiplexer circuits selecting as outputs to said output pins, said shifted operand outputs from said first stage multiplexer circuits specified by said second set of coded signals corresponding to said shifted operand shifted by a second number of shift positions in a specified shift direction, a result of said first and second number of shift positions in said specified distinct shift directions providing at said second stage multiplexer output pins, said operand shifted by said required number of shifts within a single cycle of operation.

13. The shifting apparatus of claim 12 wherein said apparatus further includes first interconnection means for connecting said plurality of said input selection circuits to said number of input pins of said first stage multiplexer circuits in a predetermined manner for applying said plurality of sets of input operand signals.

14. The shifting apparatus of claim 13 wherein said interconnection means consists of a minimum number of conductive wires.

15. The shifting apparatus of claim 13 wherein said predetermined manner is defined according to the following expression:

$D0 = I(43+j)$; $D1 = I(39+j)$; $D2 = I(35+j)$
$D3 = I(31+j)$; $D4 = I(12+j)$; $D5 = I(8+j)$
$D6 = I(4+j)$; $D7 = I(0+j)$ wherein D0-D7 correspond to pins of each first stage multiplexer circuit numbered M1 (j) wherein j has integer values from 0 to said first number of multiplexer circuits minus 1 which receive different ones of said plurality sets of input operand signals I.

16. The shifting apparatus of claim 12 wherein the number of first stage multiplexer circuits is greater than the number of second stage multiplexer circuits.

17. The shifting apparatus of claim 16 wherein said apparatus further includes second interconnection means for interconnecting the inputs of each of the second stage multiplexer circuits to the outputs of the first stage multiplexer circuits in a predetermined manner so as to minimize the number of conductive wires.

18. The shifting apparatus of claim 17 wherein said predetermined manner is defined by connecting each corresponding output M1 of said first stage multiplexer circuit numbered M1 (j) to each second stage multiplexer circuit according to the following expression:

$D0 = M1(0+k)$; $D1 = M1(1+k)$; $D2 = M1(2+k)$
$D3 = M1(3+k)$; $D4 = M1(16+k)$; $D5 = M1(17+k)$
$D6 = M1(18+k)$; $D7 = M1(19+k)$ wherein D0-D7 correspond to pins of each second stage multiplexer circuit numbered M2(k) wherein k has integer values of 0 to the number of multiplexer circuits minus 1 and j has integer values from 0 to said first number of multiplexer circuits minus 1.

19. The shifting apparatus of claim 17 wherein first and second halves of said number of inputs of each multiplexer circuit of said first and second stages are connected to provide a predetermined number of different shift positions in a predetermined direction which are opposite to each other.

20. The shifting apparatus of claim 19 wherein said first and second halves of inputs of each multiplexer circuit of said first and second stage are allocated according to the following expression:

$D0 = +(n+k)$; $D1 = +(n+2k)$; $D2 = +(n+k)$;
$D3 = +(n)$; $D4 = -(m)$; $D5 = =(m+k)$;
$D6 = -(m+2k)$; $D7 = -(m+3k)$ wherein $m = n-1$; D0-D7 correspond to pins of each multiplexer circuit and wherein $k=4$ and $n=10$ for said first stage multiplexer circuits, $k=1$ and $n=7$ for said second stage multiplexer circuits and wherein + and − signs denote left and right shifts respectively.

21. The shifting apparatus of claim 12 wherein each of a number of said plurality of selector circuits is connected to receive one of said plurality of sets of input operand signals and one of said plurality of selector circuits being connected to receive said set of control signals from a number of input sources and wherein said shifting apparatus further includes input control means connected to said plurality of selector circuits for applying coded signals designating which ones of said number of selector circuits are to apply said input operand signals to said first stage of multiplexer circuits and which one of said number of sources is to apply said set of control signals.

22. The shifting apparatus of claim 12 wherein said multiplexer circuits correspond to standard multiplexer macrocells.

23. A method of organizing a shifter for shifting large operands comprising the steps of:
(a) applying to said shifter in parallel, a plurality of sets of input operand signals corresponding to the operand to be shifted;
(b) applying to said shifter, a set of control signals specifying the number of shifts to be performed;
(c) interconnecting a first stage of multiplexer circuits in said shifter to receive said plurality of sets of input operand signals to provide a first number of selectable shifts in first and second directions;
(d) interconnecting the outputs of said first stage of multiplexer circuits to the inputs of a second stage of multiplexer circuits to provide a second number of selectable shifts in said first and second directions;
(e) generating in response to said set of control signals by shift control circuits, a pair of sets of output control signals, each set designating a shift direction and a number of shift positions; and,
(f) applying a different one of said sets to said multiplexer circuits of said first and second stages for selecting as outputs of said first and second stages respectively, said operand shifted by a first number of shifts in a specified direction and said shifted operand shifted by a second number of shifts in a specified direction, the result of said first and second number of shift positions in said specified shift directions providing at said second multiplexer outputs, said operand shifted by said required number of shifts within a single cycle of operation.

* * * * *

UNITED STATES PATENT AND TRADEMARK OFFICE
CERTIFICATE OF CORRECTION

PATENT NO. : 5,027,300
DATED : June 25, 1991
INVENTOR(S) : Glenn P. Kosteva, Peili Lin, Michel M. Raguin, and Raymond C. Robidoux It is certified that error appears in the above-identified patent and that said Letters Patent is hereby corrected as shown below:

On the title page:
The last name of inventor Michel M. Raguin is corrected to read --Michel M. Raguin-- in lieu of "Michel M. Raquin--.

Signed and Sealed this

Twenty-seventh Day of October, 1992

Attest:

DOUGLAS B. COMER

Attesting Officer     Acting Commissioner of Patents and Trademarks